July 5, 1955  F. KARNES  2,712,145
BRUSH HAVING DETACHABLE SECTIONS
Filed Nov. 1, 1950
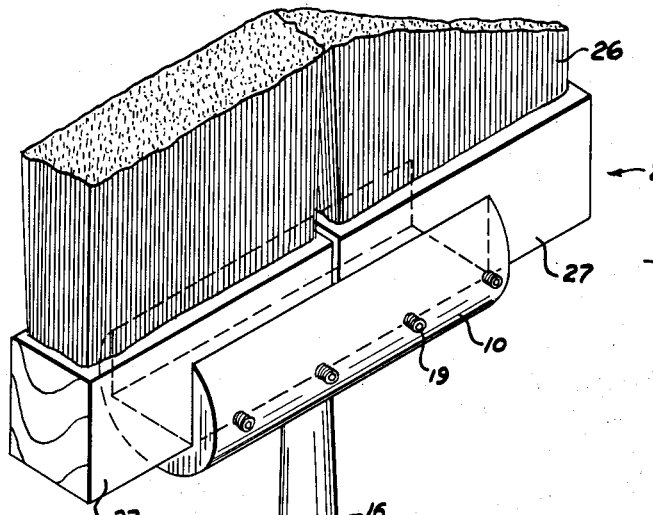
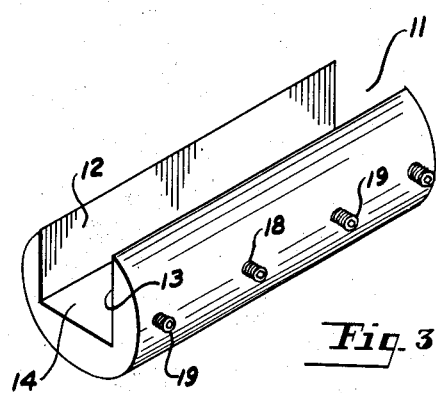
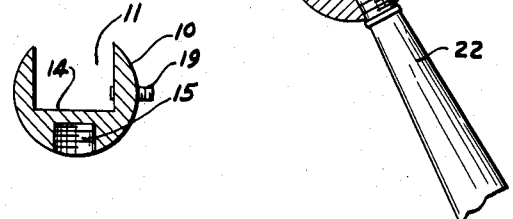
INVENTOR.
FRANK KARNES.
BY
ATTORNEY

2,712,145

BRUSH HAVING DETACHABLE SECTIONS

Frank Karnes, Detroit, Mich.

Application November 1, 1950, Serial No. 193,482

1 Claim. (Cl. 15—202)

My invention pertains to a holder in which two short brushes may be clamped in an end-to-end relation so as to form, in combination, one long brush especially adapted for use by plasterers and painters. The individual short brushes may be readily removed from the holder so that said holder and the brushes may be conveniently carried when not in use. Another advantage which may be gained by the use of my holder is the saving in cost of two short brushes over the cost of one long brush which, as is known, is quite expensive. A further purpose of my invention is to provide a holder of a simple structural design, including means of quickly and securely assembling the short brushes for use in the holder.

I shall now describe my improvements with reference to the accompanying drawing in which:

Fig. 1 is a perspective view of my brush holder with brushes therein;

Fig. 2 is an end view of the holder and the brushes therein;

Fig. 3 is a perspective view of an element of the holder;

Fig. 4 is a transverse sectional view of said element;

Fig. 5 is a transverse sectional view of a modified species of said element.

Similar numerals refer to similar parts throughout the several views.

The holder includes an oblong cylindrical member 10 preferably made of metal, such as aluminum or a magnesium alloy. The member is provided with a slot 11 extending from one end of said member to another end thereof, the walls 12 and 13, respectively, of the slot being in a parallel relation to each other while the bottom 14 of said slot is flat and is disposed at right angle to said walls. Midway its length said member 10 is provided with a threaded socket 15, the socket being located directly under the slot 11. Said member 10 is mounted upon a handle 16, the handle including a threaded end 17 adapted to be screwed into said socket 15, as best shown in Fig. 2. One side of said member 10 is provided with a plurality of alined apertures 18, said apertures being spaced from each other, as best shown in Figs. 1 and 3. The apertures, threaded inwardly, serve to receive individual set screws 19.

The modified species of my holder is shown in Fig. 5 where the cylindrical member 20 is provided with a socket 21 for reception of a handle 22, the socket being set at an angle to the bottom 23 of slot 24.

The manner in which my holder may be used is as follows:

Two conventional short brushes with handles may be employed to be combined into one long brush. In order to do so it will be necessary to cut off the handles appearing on such brushes so that only the part of the brush in which the bristles are imbedded is left. Such short brushes, with their handles cut off, are shown in Fig. 1 where they are identified generally by numeral 25, the bristles being identified by numeral 26. The heads of said brushes, which are marked 27, are inserted into the slot so that they abut each other endwise midway the ends of said cylindrical member 10. The outer end of each brush will project outwardly beyond the respective end of the cylindrical member 10. Next set screws 19 are tightened so as to bear frictionally against the heads 27 of said brushes 25.

It will be also understood that for some purposes it may be required that the brushes be set at an angle to the handle. This may be done by means of the holder shown in Fig. 5.

After having described my improvement, what I wish to claim is as follows:

A plasterer's brush comprising in combination, an elongated holder comprising a horizontally elongated body member formed with a deep slot extending downwardly from the top thereof, said slot further extending for the full length of the body member, the said walls of the slot being straight and parallel to each other, the bottom of the slot being flat and perpendicular to said side walls, a pair of brushes having horizontally elongated heads of rectangular cross section and bristles extending from the top thereof, the major portions of the brush heads slidably fitting in said slot, the overall length of the brush heads being greater than the length of the holder so that the ends of the brush heads project beyond the respective ends of the holder, set screws extending transversely through one side of the holder for engagement with the adjacent sides of the respective brush heads to secure the latter in any longitudinally adjusted position in the holder, and a handle secured at its upper end to the bottom portion of the holder.

References Cited in the file of this patent

UNITED STATES PATENTS

| | | |
|---|---|---|
| 416,597 | Gould | Dec. 3, 1889 |
| 632,748 | Raymond et al. | Sept. 12, 1899 |
| 1,060,159 | Burkhart | Apr. 29, 1913 |
| 1,391,018 | Sohnle | Sept. 20, 1921 |
| 1,599,273 | Benkosky | Sept. 7, 1926 |
| 2,044,595 | Schumann | June 16, 1936 |
| 2,629,125 | Ferfguson | Feb. 25, 1953 |
| 2,172,479 | McMillen | Sept. 12, 1939 |
| 2,490,159 | Ricchiuti | Dec. 6, 1949 |
| 2,618,802 | McWatters | Nov. 24, 1952 |
| 2,629,125 | Ferguson | Feb. 25, 1953 |
| 2,677,841 | Tetzlaff | May 11, 1954 |